United States Patent [19]
Wright

[11] 3,736,412
[45] May 29, 1973

[54] CONVERSION OF BASE B NUMBER TO BASE R NUMBER, WHERE R IS A VARIABLE

[75] Inventor: Carl Macey Wright, Cinnaminson, N.J.

[73] Assignee: RCA Corporation, Princeton, N.J.

[22] Filed: May 17, 1971

[21] Appl. No.: 143,863

[52] U.S. Cl. ..............235/155, 340/347 DD, 235/164
[51] Int. Cl. ..............H04l 3/00
[58] Field of Search ..............235/155; 340/347 DD

[56] References Cited

UNITED STATES PATENTS

| | | | |
|---|---|---|---|
| 2,929,556 | 3/1960 | Hawkins | 235/155 |
| 3,344,261 | 9/1967 | Hornung | 235/155 |
| 3,611,349 | 10/1971 | Chinal | 235/155 |
| 3,564,225 | 2/1971 | Watson | 235/155 |
| 3,373,269 | 3/1968 | Rathbun | 340/347 DD |
| 3,082,950 | 3/1963 | Hogan | 340/347 DD |
| 3,535,500 | 10/1970 | Hu | 235/155 |

*Primary Examiner*—Maynard R. Wilbur
*Assistant Examiner*—Jeremiah Glassman
*Attorney*—H. Christoffersen

[57] ABSTRACT

A binary number stored in an N stage register is shifted a bit at a time, most significant bit first, into a serial divider. The divider is adjustable in the sense that it may be set to divide by any number R, where R is the radix of the number system into which the binary number is to be converted. The divider produces a quotient bit in response to each bit it receives and produces a multiple bit, binary-coded character to the new base after each N shift pulses. The quotient bits are shifted back into the least significant bit position of the register as they are produced.

1 Claim, 4 Drawing Figures

LEGEND: ++++ = MULTIPLE CONDUCTORS

INVENTOR.
Carl M. Wright
BY [signature]
ATTORNEY

INVENTOR.
Carl M. Wright
BY
Samuel Cohen
ATTORNEY

CONVERSION OF BASE B NUMBER TO BASE R NUMBER, WHERE R IS A VARIABLE

BACKGROUND OF THE INVENTION

It is often convenient to convert a number in the binary system of notation to a number having a different base. As examples, conversion to the base 6 is useful in doing calculations involving minutes and seconds; conversion to the base 8 is useful when writing programs for octal machines; the base 10 is the decimal base and of course the one most familiar to most of us; conversion to the base 12 is useful in calculations involving hours, feet and inches; conversion to the base 16 can be used in programming problems arising with hexadecimal computers.

SUMMARY OF THE INVENTION

Apparatus embodying the present invention employs a relatively modest number of components for converting a number to one base B to a number to any one of a large number of other bases where B is an integer greater than 1. A divider, which may be adjusted to divide by a number equal to the radix to which it is desired to convert the base B number, performs divisions, first of the base B number, and then of the successive quotients which are obtained, to provide successive remainders. Each remainder is a character of different significance to the new radix.

DETAILED DESCRIPTION

The operation of the conversion system of the present invention is based on the principle that if a number in one system is divided by the radix of another system, the remainder will be the least significant digit of the number, expressed in the new system. To give some examples, to convert $3184_{10}$ to an octal number (a number in the system having the radix 8), the following steps are performed:

TABLE I

| Division | Quotient | Remainder=Octal Character |
|---|---|---|
| 3184/8 | 398 | 0 |
| 398/8 | 49 | 6 |
| 49/8 | 6 | 1 |
| 6/8 | 0 | 6 |

In the above table, the remainder in row 1 is the least significant character. The remainder in row 2 is the character of next higher significance and so on, so that $3184_{10} = 6160_8$.

A second example is the conversion of $1001110101_2$ to $629_{10}$.

TABLE II

| Division | Quotient | Remainder Binary Coded Decimal | Decimal |
|---|---|---|---|
| 1001110101/1010 | 111110 | 1001 | 9 |
| 111110/1010 | 0110 | 0010 | 2 |
| 0110/1010 | 0 | 0110 | 6 |

Figure 1:
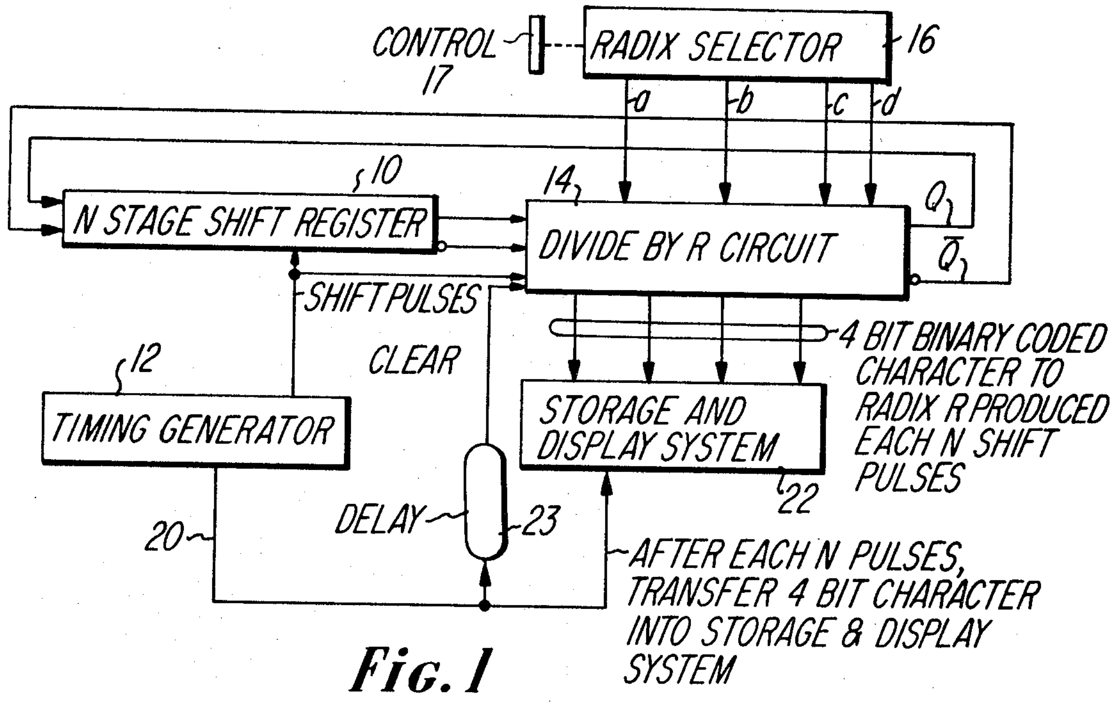
FIG. 1 is a block diagram of a system according to an embodiment of the invention.

In the system of the illustrated embodiments of the present invention, for example as shown in FIG. 1, a binary number conveniently can be translated to a number to any other base. The binary number is assumed to have N bits and initially is stored in an N stage shift register 10. A timing generator 12 supplies shift pulses to the register for shifting the stored bits, most significant bit first, from the register to the divide-by-R circuit 14 which preferably is a serial divider.

The divide-by-R circuit 14 is an adjustable divider in the sense that it can be set to divide by any number from 2 to 16 (in this example). The radix selector 16, which applies four control signals *a*, *b*, *c* and *d* to the divider 14, places the divider into the correct division state. For example, in response to one set of values of *a*, *b*, *c* and *d*, the divider 14 may be set to divide by 4. In response to another set of values, the divider 14 may be set to divide by 6, and so on. The radix selector manually may be set to produce the desired code by a control knob 17, leading, for example, to a multiple contact switch. The latter may connect a power supply terminal or ground, as examples, in various ways to the four output leads, where the voltage present at the power supply terminal may represent binary 1, and ground binary 0. Other alternative circuits and conventions are, of course, possible and within the scope of this invention. During the conversion of a binary number, the set of values a through d may remain constant, although in special cases this need not be the case. (FIG. 4, discussed later, shows an embodiment in which the value of the divisor may be changed for each division.)

The divide-by-R circuit produces, in response to each bit S (and its complement $\overline{S}$) received from the register 10, a quotient bit Q and its complement $\overline{Q}$. The quotient bit and its complement, in turn, are fed back to the least significant bit position of the N stage shift register. After the entire binary number has been shifted out of the shift register 10, that is, after N shift pulses, the divider 14 produces at its four output leads a four bit binary coded character to the new base R. (In practice, the circuit 14 also may have four additional leads, for the four complementary bits, respectively, as will be explained shortly in connection with the other figures.) In response to a transfer pulse at lead 20, the input gates to the storage and display system 22 may be primed and the four bits transferred to the storage and display system. A short time interval later, the delay circuit 23 may apply a clear pulse to the divide-by-R circuit for clearing the four stage output register (within block 14 and shown in later figures) of the divide-by-R circuit.

The storage and display system 22 is conventional. It may include a register having 4Y stages, where Y is the number of four bit characters it is desired to display. System 22 also may include a decoder and a plurality Y of multiple-segment, alpha-numeric display devices, each device for displaying a character of different significance. In response to the first four bits received at 22, the decoder activates the multiple segment display device for the least significant character to the new base and the latter displays this character.

The process above is repeated a sufficient number of times to produce the complete number — the Y characters, to the new base. In response to each N shift pulses, a new character is produced at the four output leads of the divide-by-R circuit and this new character is displayed by another display device in display system 22. In a matter of a fraction of a second, all Y characters to the new base will be displayed.

Figure 2:
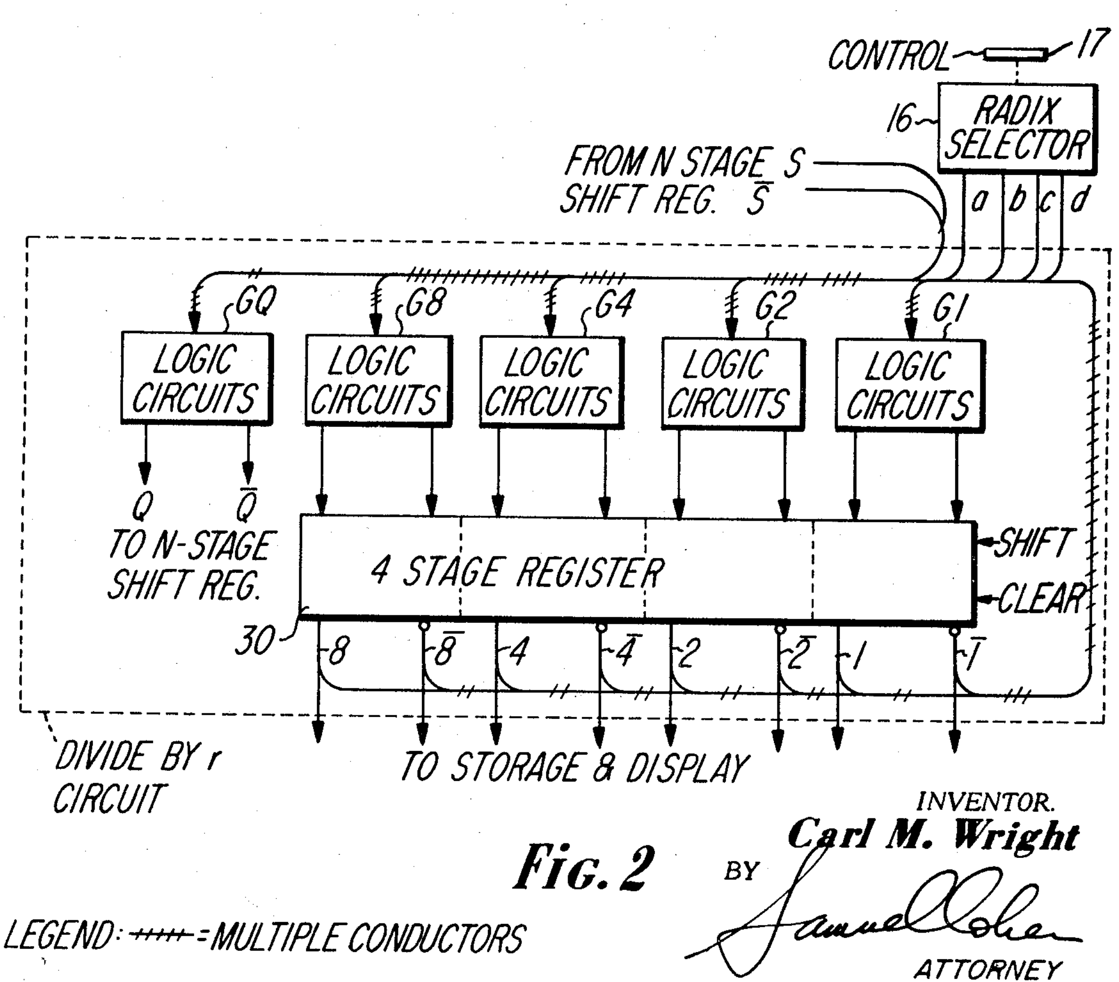
FIG. 2 is a block diagram of the divider of FIG. 1.

A more detailed showing of the divide-by-R circuit appears in FIG. 2. It includes five sets of logic circuits G1, G2, G4, G8 and GQ. The first four logic circuits supply their outputs to a four stage register 30. The fifth logic circuit GQ produces the quotient bit Q and its complement $\bar{Q}$. The four stage register 30 produces four output signals 1, 2, 4 and 8, where 1 represents the $2^0$ bit, 2 the $2^1$ bit, 4 the $2^2$ bit, and 8 the $2^3$ bit. The register 30 also produces the four complementary bits $\bar{1}$, $\bar{2}$, $\bar{4}$ and $\bar{8}$. These bits, as well as the radix selection bits *a, b, c* and *d* and the bits S and $\bar{S}$ from the N stage shift register 10 are applied in various ways to the logic circuits, as discussed shortly.

Table III below describes the operation of circuits G through GQ. Each equation indicates the logic function performed by a particular circuit in response to the radix selection bits *a, b, c, d* applied to that circuit. For example, when the radix is 3, the circuit G2 implements the equation $1\bar{S} + 2S$ and when the radix is 7, the circuit G2 implements the equation $4\bar{1}S + 1\,(\bar{4} + \bar{S})$.

TABLE III

| Radix | G1 | G2 |
|---|---|---|
| 2 | S | 0 |
| 3 | $\bar{2}\bar{1}S+2\bar{S}$ | $1\bar{S}+2S$ |
| 4 | S | 1 |
| 5 | $\bar{S}(4+21)$ | $4\bar{S}+1(S+\bar{2})$ |
| 6 | S | $4\bar{1}+\bar{4}2\bar{1}$ |
| 7 | $4\bar{S}+\bar{4}S(\bar{2}+\bar{1})$ | $4\bar{1}S+1(\bar{4}+\bar{S})$ |
| 8 | S | 1 |
| 9 | $8\bar{S}+4\bar{S}(2+1)+\bar{8}\bar{4}S$ | $8\bar{S}+a(\bar{4}+S)+42\bar{1}\bar{S}$ |
| 10 | S | $8\bar{1}+\bar{8}\bar{4}1+42\bar{1}$ |
| 11 | $8\bar{S}+\bar{8}(\bar{4}S+\bar{2}\bar{1})+42\bar{S}$ | $8\bar{2}\bar{1}S+\bar{8}\bar{4}1+1S$ |
| 12 | S | 1 |
| 13 | $8\bar{S}+\bar{8}S(\bar{4}+\bar{2})+421S$ | $8(1S+\bar{1}\bar{S})+\bar{8}(\bar{4}2\bar{1}+\bar{2}1+41S$ |
| 14 | S | $8\bar{1}+\bar{8}1(\bar{4}+\bar{2})$ |
| 15 | $8\bar{S}+\bar{8}S(\bar{4}+\bar{2}+\bar{1})$ | $8(1\bar{S}+\bar{1}S)+\bar{8}1(\bar{4}+\bar{2})+1\bar{S}$ |
| 16 | S | 1 |

| Radix | G4 | G8 | GQ |
|---|---|---|---|
| 2 | 0 | 0 | 1 |
| 3 | 0 | 0 | 1S+2 |
| 4 | 0 | 0 | 2 |
| 5 | $4S+2\bar{1}\bar{S}$ | 0 | 4+2(S+1) |
| 6 | $41+2\bar{1}$ | 0 | 4+21 |
| 7 | $41S+2(\bar{S}+\bar{1})$ | 0 | 4+213 |
| 8 | 2 | 0 | 4 |
| 9 | $8\bar{S}+S(\bar{4}+1+S)$ | $8S+4\bar{2}\bar{1}\bar{S}$ | 8+4(S+2+1) |
| 10 | $8\bar{1}+2(\bar{4}+1)$ | $81+4\bar{2}\bar{1}$ | 8+4(2+1) |
| 11 | $8\bar{2}(\bar{S}+\bar{1})+\bar{8}\bar{4}2+21S$ | $8(2+1S)+4\bar{2}(\bar{S}+\bar{1})$ | 8+4(2+1S) |
| 12 | $8\bar{2}+\bar{8}\bar{4}2$ | $82+4\bar{2}$ | 8+42 |
| 13 | $8\bar{2}(S+1)+\bar{8}\bar{4}2+2\bar{1}\bar{S}$ | $82(S+1)+4\bar{2}+4\bar{1}(\bar{S}+\bar{2})$ | 8+42(S+1) |
| 14 | $84+\bar{8}2\bar{1}+421$ | $821+4(\bar{2}+\bar{1})$ | 8+421 |
| 15 | $8\bar{2}1S+\bar{8}\bar{4}2+2(\bar{1}+\bar{S})$ | $821S+4(\bar{2}+\bar{1}+\bar{S})$ | 8+421S |
| 16 | 2 | | 8 |

Figure 3:
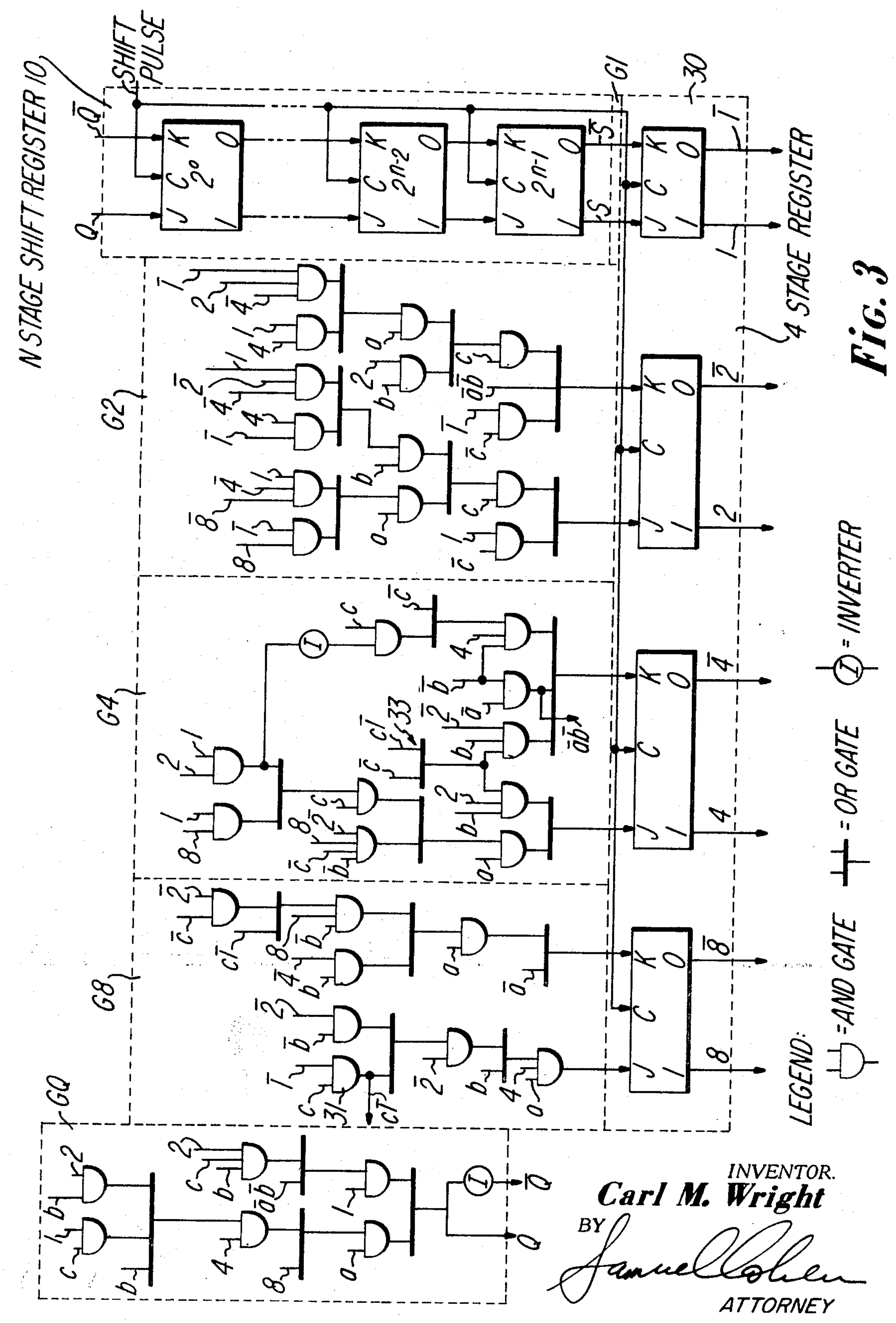
FIG. 3 is a block diagram showing more details of a divider circuit useful for an embodiment of the invention designed for conversion of a binary number to a number to a base selected from a limited group of the more useful bases.

The numbers to the different bases are not equally useful. Accordingly, for purposes of illustration, a mechanization of the system of the present invention which is suitable for the conversion to only six different bases — the most popular six, is illustrated in FIG. 3. As there are only six different bases, the radix selector 16 need produce only three output signals *a, b* and *c* (these three leads permit eight different codes to be produced and this is more than the number of codes needed). Table IV below shows the actual codes which are employed.

TABLE IV

| Radix | *a* | *b* | *c* |
|---|---|---|---|
| 2 | 0 | 0 | 1 |
| 6 | 0 | 1 | 1 |
| 8 | 0 | 1 | 0 |
| 10 | 1 | 0 | 1 |
| 12 | 1 | 0 | 0 |
| 16 | 1 | 1 | 0 |

The four stage register employed in FIG. 3 consists of four clocked JK flip-flops. These operate according to the following truth table. In each case, the new information is shifted into a flip-flop (into a register stage) in response to a shift pulse.

TABLE V

| Before Clock | | After Clock | |
|---|---|---|---|
| J | K | 1 | 0 |
| 1 | 0 | 1 | 0 |
| 0 | 1 | 0 | 1 |
| 0 | 0 | * | * |
| 1 | 1 | # | # |

Legend: * = Remains at previous value
# = Changes to complementary value

From the equations of Table III it is clear that for the six radices chosen for this example, the output signal produced by circuit G1 is, in each case, equal to the input signal. Therefore this circuit degenerates, in this example, simply to a pair of wires (the extra wire is for $\bar{S}$) as shown within dashed block G1 in FIG. 3.

Referring now to FIG. 3, each circuit G2, G4, G8 and GQ consists of combinations of AND and OR gates and, in some cases, inverters. The Boolean equations below define the operation of each group of gates. In these equations, a term such as G2J refers to the signal present at the J output terminal of logic circuit G2; a term such as G2K refers to the signal output at the K terminal of circuit G2. The signals *a, b* and *c* are produced by the radix selector. Their complements, when needed, may be produced by passing the signals through logical inverters which may also be within the radix selector.

1. $G1J = S$
2. $G1K = \bar{S}$
3. $G2J = \bar{c}1+c(a(8\bar{1}+\bar{8}\bar{4}1)+b(4\bar{1}+\bar{4}\bar{2}1))$
4. $G2K = \bar{c}\bar{1}+\bar{a}\bar{b}+c(b2+a(41+\bar{4}2\bar{1}))$
5. $G4J = 2b(\bar{c}+c\bar{1})+a(\bar{b}\bar{c}8\bar{2}+c(8\bar{1}+21))$
6. $G4K = \bar{2}b(\bar{c}+c\bar{1})+\bar{a}\bar{b}+\bar{b}4(\bar{c}+c(\bar{2}+\bar{1})$
7. $G8J = a4(b+\bar{2}(c\bar{1}+\bar{b}\bar{2}))$
8. $G8K = \bar{a}+a(b\bar{4}+\bar{b}8(\bar{c}\bar{2}+c\bar{1}))$
9. $Q = a(8+4(b+c1+\bar{b}2))+1(\bar{a}\bar{b}+bc2)$ In the operation of the circuit of FIG. 3, after a shift pulse has been completed, the signals such as S and $\bar{S}$ and so on are shifted into the JK flip-flop receiving these signals. These signals are applied back to the various gates in the way shown in FIG. 3. In addition, certain of these gates receive the *a, b* and *c* signals from the radix selector. In addition, certain of the gates receive a signal which may be the AND function of two signals, said AND function being produced by another gate. For example, the output signal $c\bar{1}$ of AND gate 31 serves as an input signal to OR gate 33. The various logic gates are placed in an enabled or disabled state in response to the various signals they receive to produce at each J and K terminal, signals representing the binary quantities 1 or 0. For example, the J terminal of the flip-flop producing the 2 and $\bar{2}$ signals may receive inputs J = 1, K = 0. In this case, in response to the next shift pulse, these signals will be stored in this flip-flop.

Some specific examples of conversions performed with the FIG. 3 circuit are given below. In these examples N, the number of stages in the shift register 10 of FIG. 1, is equal to 5 as are the number of bits in the binary number initially stored in the register.

Example 1) Conversion of $10111_2$ to $23_{10}$

| | Quotient Bit Q | Number in 8421 Reg. 30 | Binary No. in N Stage Reg. 10 |
|---|---|---|---|
| Initial State | 0 | 0000 | 10111 |
| Shift Pulse # | | | |
| 1 | 0 | 0001 | 01110 |
| 2 | 0 | 0010 | 11100 |
| 3 | 0 | 0101 | 11000 |
| 4 | 1 | 0001 | 10001 |
| 5 | 0 | 0011 | 00010 |
| | | LSD = 3 | MSD = 2 |

$$\text{Therefore } 10111_2 = [0010 \quad 0011]_{10}$$

$$23_2 = 23 \text{ (BCD)}$$

In the example above, after five shift pulses, the number 2 is stored in the N stage register 10. After five additional shift pulses, the number 2 will be shifted into the 8421 register 30, without alteration. It can be shown that any time the number stored in the N stage register 10 is lower in value than the new radix R, it will be shifted into the 8421 register, via the logic circuits shown in FIG. 3, without change in value.

Example 2) Conversion of 10111 to $1B_{12}$, where $B_{12} = 11_{10}$

| | Quotient Bit Q | Number in 8421 Reg. | Binary No. in N Stage Reg. |
|---|---|---|---|
| Initial State | 0 | 0000 | 10111 |
| Shift Pulse # | | | |
| 1 | 0 | 0001 | 01110 |
| 2 | 0 | 0010 | 11110 |
| 3 | 0 | 0101 | 11000 |
| 4 | 0 | 1111 | 10000 |
| 5 | 1 | 1011 | 00001 |
| | | LSD = B | MSD = 1 |

$$\text{Therefore } 10111_2 = [0001 \quad 1011]_{12}$$

$$23_2 = 1B_{12}$$

Example 3) Conversion of 10111 to $35_6$

| | Quotient Bit Q | Number in 8421 Reg. | Binary No. in N Stage Reg. |
|---|---|---|---|
| Initial State | 0 | 0000 | 10111 |
| Shift Pulse # | | | |
| 1 | 0 | 0001 | 01110 |
| 2 | 0 | 0010 | 11100 |
| 3 | 0 | 0101 | 11000 |
| 4 | 1 | 0101 | 10001 |
| 5 | | 0101 | 00011 |
| | | LSD = 5 | MSD = 3 |

$$\text{Therefore } 10111_2 = [0011 \quad 0101]_6$$

$$23_2 = 35_6$$

Figure 4:
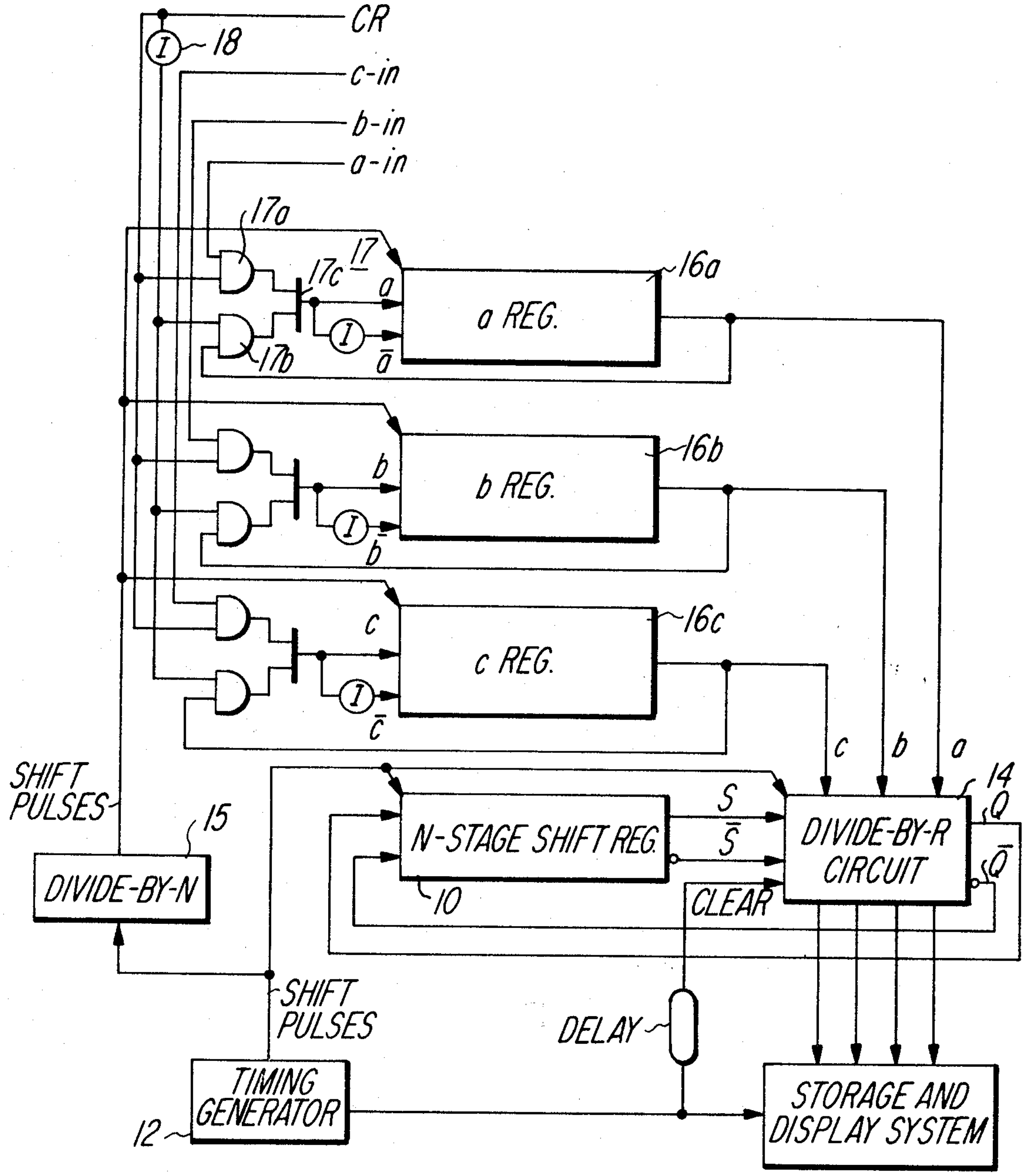
FIG. 4 is a block diagram of another embodiment of the invention.

Another embodiment of the invention, shown in FIG. 4, illustrates how the radix designation can be changed for each displayed digit. The values of the radix digits *a*, *b*, and *c* are stored in three shift registers 16*a*, 16*b*, and 16*c* which operate in parallel. The bits of the *a* radix digit are stored in the *a* shift register 16*a;* the bits for the *b* digit of the radix digit are stored in the *b* register 16*b;* and bits of the *c* radix digit are stored in the shift register 16*c*. The output signals of the radix shift registers 16*a*, 16*b*, and 16*c* are coupled to the divide-by-R circuit 14. The shift pulses that are applied to the N stage shift register 10 and the divide-by-R register 14 are coupled to the radix shift registers 16*a*, 16*b*, and 16*c* through a divide-by-N counter 15. Thus, for each N shift pulses from the timing generator 12, a shift pulse is applied to the radix shift registers 16*a*, 16*b*, and 16*c*. The radix characters in the output stages of the radix shift registers remain the same for each group of N pulses and therefore designate the radix of the character being determined during each cycle of the system as determined by N shift pulses.

The input signals to the radix shift registers 16*a*, 16*b* and 16*c* are determined by a gating network 17 which permits the contents of the radix registers to be changed. A change radix signal CR primes a set of AND gates, of which the AND gate 17*a* is typical, to permit a new radix character to be shifted into the radix shift registers. The absence of the change radix signal CR is inverted by an inverter 18 to prime the recirculation gates at each of the radix shift registers such as the AND gate 17*b*. Therefore, when the change radix signal is absent, the contents of the radix shift registers are recirculated, i.e., the output signal is returned as an input signal, in the case of the A register, via the AND gate 17*b* through the OR gate 17*c*.

The advantage of having a changeable radix is that it permits mixed radices to be used during operations on the digits in the N stage shift register 10. Another advantage is that the invention can be used in a system in which each number is encoded from its specific radix R into the radix B to be stored in the interstage shift register 10 on a digit-by-digit basis. If an incorrect digit is entered inadvertently into the system, it will have been converted into the B radix by the time it appears on the indicator. This system permits the number to be corrected by clearing the last digit instead of clearing the entire number entered up to the incorrect digit. This is done simply by generating a set of N shift pulses and ignoring the result in the divide-by-R circuit 14. The number remaining in the N stage shift register 10 will then be the number that was stored just prior to the entry of the incorrect digit.

An important feature of the various embodiments of the present invention is that they are relatively simple and accordingly relatively inexpensive. One particularly suitable use for the invention is in desk top calculators where the time required for the serial shifting is not a disadvantage as such shifting can be carried out in a fraction of the time necessary to depress a key.

What is claimed is:

1. A circuit for changing a number to one base to a number to any one of M other bases comprising, in combination:

a divider which can be adjusted to divide by any integer chosen from a group of M such intergers, where M is an integer greater than 1;

control means for setting said divider to perform a division by any one of the integers in said group;

means for applying a number to a base other than R to said divider and obtaining therefrom a quotient Q and a remainder T, where said control means has set said divider to divide by the integer R in said group;

means for applying each quotient thereby obtained back to the divider to obtain, in each case, a new quotient and new remainder until the final remainder obtained is of a value less than that of the integer R, whereby each remainder T obtained by the divider is a character of different significance; and said control means including means for maintaining R at one value during the first division in which a remainder is obtained, and for thereafter setting the value of R to any desired value from 2 to M during any other division in which a new remainder is obtained.

* * * * *